(12) United States Patent
Kahnt et al.

(10) Patent No.: US 10,994,632 B2
(45) Date of Patent: May 4, 2021

(54) DUAL-VOLTAGE BATTERY

(71) Applicant: HELLA GMBH & CO. KGAA, Lippstadt (DE)

(72) Inventors: Sebastian Kahnt, Karlstadt (DE); André Koerner, Lippstadt (DE)

(73) Assignee: Hella GmbH & Co. KGaA, Lippstadt (DE)

(*) Notice: Subject to any disclaimer, the term of this patent is extended or adjusted under 35 U.S.C. 154(b) by 0 days.

(21) Appl. No.: 16/419,633

(22) Filed: May 22, 2019

(65) Prior Publication Data

US 2019/0270391 A1 Sep. 5, 2019

Related U.S. Application Data

(63) Continuation of application No. PCT/EP2017/079729, filed on Nov. 20, 2017.

(30) Foreign Application Priority Data

Nov. 22, 2016 (DE) ...................... 10 2016 122 444.8

(51) Int. Cl.
*B60L 58/19* (2019.01)
*B60L 50/64* (2019.01)
(Continued)

(52) U.S. Cl.
CPC .................. *B60L 58/19* (2019.02); *B60L 7/10* (2013.01); *B60L 50/64* (2019.02); *B60L 58/20* (2019.02);
(Continued)

(58) Field of Classification Search
CPC ..... Y02T 90/14; Y02T 90/128; Y02T 90/163; Y02T 10/7005; Y02T 10/7088;
(Continued)

(56) References Cited

U.S. PATENT DOCUMENTS 10,050,437 B2    8/2018 Nomoto
2011/0001442 A1   1/2011 Lee et al.
(Continued)

FOREIGN PATENT DOCUMENTS

DE           10055531 A1    1/2002
DE     102013113182 A1    5/2015
(Continued)

*Primary Examiner* — Nathaniel R Pelton
*Assistant Examiner* — Mohammed J Sharief
(74) *Attorney, Agent, or Firm* — Muncy, Geissler, Olds & Lowe, P.C.

(57) ABSTRACT

A dual-voltage battery for a vehicle includes a plurality of battery cells, wherein in each case a group of battery cells is connected to a battery cell block, and a battery electronics system with a plurality of power switching elements for connection in series or in parallel of in each case individual battery cell blocks. In a first connection arrangement of the battery cell blocks, a first voltage is provided and in a second connection arrangement, a second voltage is provided. At least a first battery cell block is provided as part of a first voltage supply unit, at least a second battery cell block is provided as part of a second voltage supply unit, at least two third battery cell blocks are provided as part of a third voltage supply unit, and at least two fourth battery cell blocks are provided as part of a fourth voltage supply unit.

21 Claims, 10 Drawing Sheets

(51) Int. Cl.
*B60L 58/20* (2019.01)
*H02J 7/00* (2006.01)
*H01M 10/42* (2006.01)
*H02J 7/14* (2006.01)
*H01M 10/04* (2006.01)
*B60L 7/10* (2006.01)
*H02J 1/00* (2006.01)
*H01M 50/258* (2021.01)
*B60R 16/033* (2006.01)
*H02J 1/08* (2006.01)

(52) U.S. Cl.
CPC ..... *H01M 10/0445* (2013.01); *H01M 10/425* (2013.01); *H01M 50/258* (2021.01); *H02J 1/00* (2013.01); *H02J 7/0024* (2013.01); *H02J 7/0026* (2013.01); *H02J 7/1461* (2013.01); *B60L 2210/10* (2013.01); *B60R 16/033* (2013.01); *B60Y 2400/112* (2013.01); *H02J 1/082* (2020.01); *H02J 7/1423* (2013.01); *Y02T 10/70* (2013.01); *Y02T 10/72* (2013.01)

(58) Field of Classification Search
CPC ............... Y02T 10/7216; Y02T 10/705; Y02T 10/7055; B60L 58/19; B60L 7/10; B60L 50/64; B60L 58/20; B60L 2210/10; H01M 10/425; H01M 10/0445; H01M 2/0245; H02J 7/1461; H02J 1/00; H02J 7/0024; H02J 7/0026; H02J 1/082; H02J 7/1423; H02J 2310/48; H02J 7/0021; H02J 7/0016; H02J 7/0013; H02J 7/0014; H02J 7/0019; B60R 16/033; B60Y 2400/112; Y02E 60/12; G01R 31/3658

USPC .......................................... 320/109, 116, 117
See application file for complete search history.

(56) References Cited

U.S. PATENT DOCUMENTS

| | | | |
|---|---|---|---|
| 2012/0194138 A1* | 8/2012 | Uno | H02J 7/0019 320/119 |
| 2013/0285612 A1* | 10/2013 | Okuda | H02J 7/0068 320/126 |
| 2014/0021925 A1* | 1/2014 | Asakura | B60L 58/18 320/126 |
| 2014/0035531 A1* | 2/2014 | Garnier | H02J 1/08 320/118 |
| 2014/0152262 A1 | 6/2014 | Nomoto | |
| 2014/0167657 A1* | 6/2014 | Nishikawa | B60L 58/21 318/139 |
| 2015/0246650 A1* | 9/2015 | Nakajima | B60R 16/0207 180/68.5 |
| 2016/0149421 A1* | 5/2016 | White | H02J 7/0021 320/121 |
| 2016/0339958 A1* | 11/2016 | Fujita | B62D 15/0235 |
| 2017/0187202 A1* | 6/2017 | Shin | H02J 7/007 |
| 2018/0001850 A1* | 1/2018 | Kontani | H02J 1/10 |
| 2018/0109122 A1 | 4/2018 | Koerner | |
| 2018/0375177 A1* | 12/2018 | Mori | H02J 7/0068 |

FOREIGN PATENT DOCUMENTS

| | | |
|---|---|---|
| DE | 102015104293 A1 | 9/2016 |
| EP | 2688179 A1 | 1/2014 |
| JP | H08322103 A | 12/1996 |
| WO | WO2011002482 A1 | 1/2011 |

* cited by examiner

DUAL-VOLTAGE BATTERY

This nonprovisional application is a continuation of International Application No. PCT/EP2017/079729, which was filed on Nov. 20, 2017, and which claims priority to German Patent Application No. 10 2016 122 444.8, which was filed in Germany on Nov. 22, 2016, and which are both herein incorporated by reference.

BACKGROUND OF THE INVENTION

Field of the Invention

The present invention relates to a battery and more particularly to a dual-voltage battery for a vehicle.

Description of the Background Art

A generic dual-voltage battery is known from DE 10 2013 113 182 A1. The known dual-voltage battery is constructed such that in a dual-voltage electric system, a first group of electrical loads can be operated by means of the battery at a first voltage provided by the dual-voltage battery, and that a second group of electrical loads can be operated at a second voltage, also provided by the dual-voltage battery. For example, the dual-voltage battery serves to supply energy to a 12V electrical system and to a 48V electrical system of the vehicle. In a dual-voltage battery, the two voltages can be provided in particular at the same time via different connection points.

SUMMARY OF THE INVENTION

It is therefore an object of the present invention to provide a dual-voltage battery with the least possible effort in an electrically redundant manner such that the failure of individual battery cell blocks does not lead to a critical operating state of the vehicle and that in particular safety-related electrical loads can be redundantly powered by the inventive dual-voltage battery.

To achieve the object, certain exemplary embodiments of the invention provide a dual-voltage battery for a vehicle, comprising a plurality of battery cells, wherein in each case a group of battery cells is connected to a battery cell block, and comprising a battery electronics system with a plurality of power switching elements for connecting in series and/or in parallel in any case individual battery cell blocks, wherein in a first connection arrangement of the battery cell blocks, a first voltage, and wherein in a second connection arrangement of the battery cell blocks, a second voltage wherein at least one first battery cell block is provided as part of a first voltage supply unit, and at least one second battery cell block as part of a second voltage supply unit, and at least two third battery cell blocks as part of a third voltage supply unit, and at least two fourth battery cell blocks as part of a fourth voltage supply unit, wherein the first voltage supply unit and the third voltage supply unit form a first energy submodule, and the second voltage supply unit and the fourth voltage supply unit form a second energy submodule, and wherein the voltage supply units are interconnected such that the first voltage is provided by the first energy submodule and/or by the second energy submodule at a first connection point and at a second connection point of the dual-voltage battery, and that the second voltage is provided by the first energy submodule and by the second energy submodule at a third connection point and at a fourth connection point of the dual-voltage battery.

The particular advantage of the invention is that the inventive dual-voltage battery provides the two voltages simultaneously and redundantly. The provision of this redundancy makes it possible to guarantee a high supply to the vehicle electrical system and to counteract vehicle states that may be critical to safety, which can occur for example due to a fault in the electrical loads. The redundancy is achieved by the battery cell blocks of the dual-voltage battery internally forming two energy submodules, of which in each case the first voltage and the second voltage can be provided, with the result that in a critical operating state, the electrical loads can be selectively supplied by one of the two energy submodules. A defect in one of the two energy submodules accordingly does not lead to a fault in critical electrical loads.

According to the invention, two voltage supply units are provided within the two energy submodules which supply the first voltage and/or the second voltage. The voltages are available in each case at separate connection points of the dual-voltage battery, wherein two connection points are provided for the first voltage, and two further connection points are provided for the second voltage.

According to a preferred embodiment of the invention, the first energy submodule and the second energy submodule are connected via a first line and a second line. The first line is associated with a first module disconnect switch and the second line with a second module disconnect switch, wherein via the first module disconnect switch, the first voltage supply unit provided for supplying the first voltage cooperates with the second voltage supply unit provided for supplying the first voltage, and, via the second module disconnect switch, the third voltage supply unit provided for supplying the second voltage and the fourth voltage supply unit also provided for supplying the second voltage are coupled. According to the invention, each module disconnect switch can be moved to an open position and to a closed position, wherein in a normal operating state, the first module disconnect switch and the second module disconnect switch are closed for connecting the energy submodules, and wherein in an emergency operating state of the dual-voltage battery, which exists when a fault occurs in a section of the electrical system or when a voltage supply unit of the dual-voltage battery fails, at least one module disconnect switch is opened in order to disconnect the defective voltage supply unit. Advantageously, by providing the module disconnect switches, the configuration of the dual-voltage battery can be actively changed, and the electrical loads can be supplied either via the first energy submodule or the second energy submodule, or by both energy submodules.

According to a development of the invention, the first voltage supply unit and the second voltage supply unit each comprise exactly one battery cell block. For example, the one battery cell block of the first voltage supply unit and the one battery cell block of the second voltage supply unit provide a first voltage of 12V for a 12V electrical system of the vehicle. In this respect, loads operated at 12V are supplied with power via the first voltage supply unit and/or the second voltage supply unit in the electrical system of the vehicle. Advantageously, configuring the first voltage supply unit and the second voltage supply unit with a single battery cell block is structurally very simple and cost-effective. Moreover, the space requirement for the one battery cell block is relatively low, with the result that integration in the typically limited space of a vehicle is comparatively easy.

According to a development of the invention, the third voltage supply unit and the fourth voltage supply unit include three or more battery cell blocks, which are selectively switched in parallel or in series by the power switching elements. By the third voltage supply unit and the fourth voltage supply unit, for example, a 48V voltage is nominally provided as the second voltage when the first voltage supply unit and/or the second voltage supply unit nominally provide the 12V voltage.

According to a development of the invention, all battery cell blocks of the dual-voltage battery are identical in design. Advantageously, the structural design of the dual-voltage battery in the redundant version of the invention is particularly simple in terms of construction when structurally identical battery cell blocks are used for all voltage supply units. The use of identical parts, for example in the area of the power switching elements, furthermore reduces the cost of the dual-voltage battery.

According to a development of the invention, separate housings are provided for the first energy submodule and for the second energy submodule of the dual-voltage battery. Advantageously, by the provision of separate housings for the energy submodules, the dual-voltage battery can be arranged distributed in the vehicle. This results in improved safety, for example, in the event of an accident in which the vehicle is damaged either in the front region or the tail region. The energy submodules are connected in particular via the first line with the first module disconnect switch and the second line with the second module disconnect switch, wherein the module disconnect switches are preferably arranged outside the housings of the energy submodules. According to the invention, it can be provided that the first connection point for the first voltage and the third connection point for the second voltage are formed on the housing of the first energy submodule, and that the second connection point for the first voltage and the fourth connection point for the second voltage are formed on the housing of the second energy submodule.

According to an alternative embodiment of the invention, a common housing may be provided for the energy submodules of the dual-voltage battery. By using a common housing, the dual-voltage battery can be made very compact and easy to handle. The module disconnect switches can be provided inside and outside the housing.

According to a development of the invention, separate ground points are provided for the energy submodules. Advantageously, the supply security is further improved by providing separate ground points for the energy submodules.

From the other dependent claims and the following description, further advantages, features and details of the invention can be found. Features mentioned there can be essential to the invention either individually or in any combination thereof. The drawings serve merely by way of example to clarify the invention and have no limiting character.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

With reference to the accompanying drawings, the invention is explained in more detail below. The drawings show.

DETAILED DESCRIPTION

Figure 1:
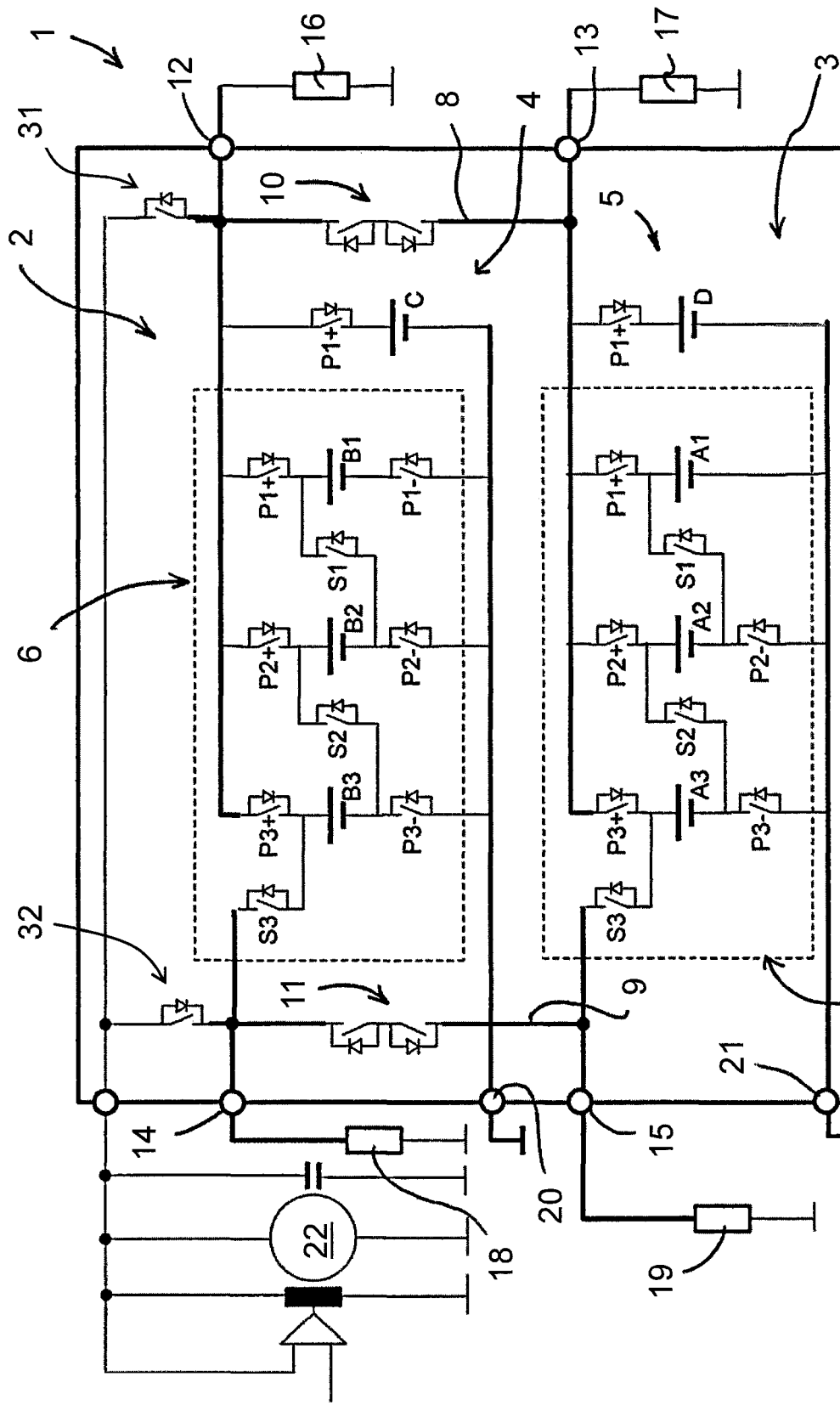
FIG. 1 is a first configuration of a dual-voltage battery according to the invention, with a first energy submodule and a second energy submodule and a common housing for the two energy submodules.

In FIG. 1, a dual-voltage battery 1 according to the invention comprises a first energy submodule 2 and a second energy submodule 3, each having four battery cell blocks A1, A2, A3, B1, B2, B3, C, D. In this case, a first battery cell block C is provided as part of a first voltage supply unit 4, and a second battery cell block D as part of a second voltage supply unit 5. Further, three third battery cell blocks B1, B2, B3 are arranged as part of a third voltage supply unit 6, and three fourth battery cell blocks A1, A2, A3 as part of a fourth voltage supply unit 7. The first voltage supply unit 4 and the third voltage supply unit 6 with the battery cell blocks B1, B2, B3, C are part of the first energy submodule 2, and the second voltage supply unit 5 and the fourth voltage supply unit 7 with the battery cell blocks A1, A2, A3, D are part of the second energy submodule 3.

In each case, the first battery cell block C and the second battery cell block D are assigned a power switching element P1+ for the parallel connection of the battery cell block C, D. Likewise, the battery cell blocks A1, A2, A3, B1, B2, B3 of the third voltage supply unit 6 and the fourth voltage supply unit 7 are assigned further power switching elements P1+, P1−, P2+, P2−, P3+, P3−, S1, S2, S3, which are formed and arranged for connection in parallel of the third battery cell blocks B1, B2, B3 and/or the fourth battery cell blocks A1, A2, A3 in a first connection arrangement thereof or for the connection in series of the third battery cell blocks B1, B2, B3 and/or the fourth battery cell blocks A1, A2, A3 in a second connection arrangement.

The first energy submodule 2 of the dual-voltage battery 1 having the first voltage supply unit 4 and the third voltage supply unit 6 is connected to the second energy submodule 3 via a first line 8 and a second line 9. The first line 8 is assigned a first module disconnect switch 10 and the second line 9, a second module disconnect switch 11. Furthermore, the first energy submodule 2 includes a first connection point 12 and the second energy submodule 3 includes a second connection point 13 via which in each case the first voltage is provided. Further, the first energy submodule 2 includes a third connection point 14, and the second energy submodule 3 a fourth connection point 15. The second voltage is provided via the third connection point 14 and the fourth connection point 15.

A group of first electrical loads 16 is connected via the first connection point 12 of the dual-voltage battery, and a second group of electric loads 17 is connected via the second connection point 13. In each case, the first electrical loads 16 and the second electrical loads 17 are operated at the first voltage. In an analogous manner, a group of third electrical loads 18 is connected via the third connection point 14, and a group of fourth electrical loads 19 is connected via the fourth connection point 15, which are operated at the second voltage.

In the illustrated embodiment of the invention, the energy submodules 2, 3 of the dual-voltage battery 1 have separate ground points 20, 21. In this case, the first energy submodule 2 with the first voltage supply unit 4 and the third voltage supply unit 6 is assigned a first ground point 20, and the second energy submodule 3 with the second voltage supply unit 5 and the fourth voltage supply unit 7 is assigned a second ground point 21, which are provided spaced apart on a housing 24.

By way of example, the dual-voltage battery 1 is further assigned a starter-generator 22 which is either powered by the dual-voltage battery 1 at the second voltage and/or the first voltage or which loads electric power into the dual-voltage battery 1 at the first voltage and/or the second voltage during generator operation. For example, the starter-generator 22 is designed for energy recovery when braking the vehicle or in other overrun modes of the internal combustion engine of the vehicle.

According to the invention, the dual-voltage battery 1 is configured to be fully redundant in terms of the two vehicle supply voltages. The various electrical loads 16, 17, 18, 19 can be supplied with electrical power either by the first energy submodule 2 or by the second energy submodule 3 or by both energy submodules 2, 3 together. This ensures a high supply security for the electrical loads 16, 17, 18, 19, and it is in particular ensured that safety-critical electrical loads are supplied with electrical power even in the event that individual battery cell blocks A1, A2, A3, B1, B2, B3, C, D of the dual-voltage battery 1 fail.

For example, the supply to the first electrical loads 16 and the second electrical loads 17 via the first energy submodule 2, i.e., the first voltage supply unit 4, may be interrupted due to a defect of the first battery cell block C. In this case, the first module disconnect switch 10 in combination with the power switching element P1+ of the first battery cell block C can be interconnected such that the first electrical loads 16 and the second electrical loads 17 are powered by the second battery cell block D of the second energy submodule 3. Similarly, in the event of a fault in the fourth voltage supply unit 7, the third electrical loads 18 and the fourth electrical loads 19 can be powered via the first energy submodule 2 and there, via the third voltage supply unit 6. In this case, the connection to the fourth voltage supply unit 7 is interrupted and the second module disconnect switch 11 is switched such that the fourth electrical load 19 is powered via the first energy submodule 2 at the second voltage.

Figure 2:
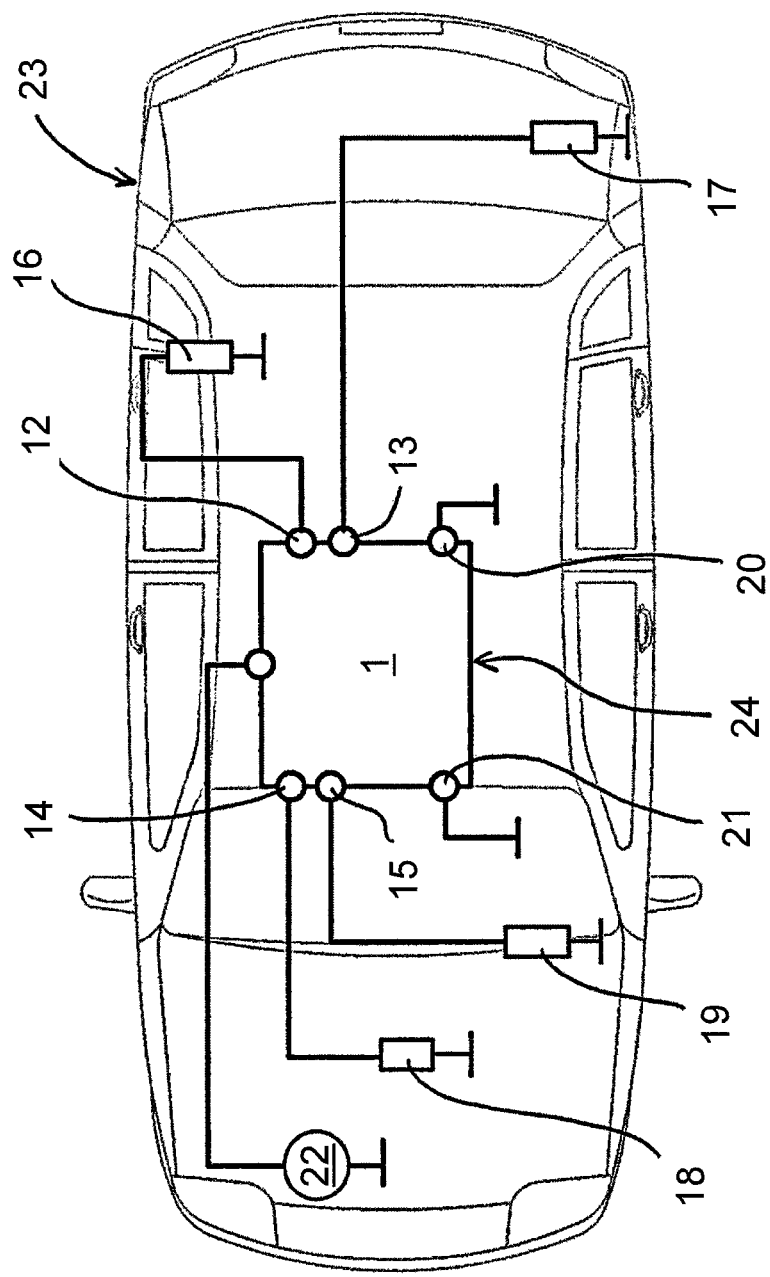
FIG. 2 is a schematic diagram of the arrangement of the dual-voltage battery according to FIG. 1, in a vehicle.

FIG. 2 shows the basic integration of the dual-voltage battery 1 according to FIG. 1 in a vehicle 23. Here, the dual-voltage battery 1 includes the common housing 24. The four connection points 12, 13, 14, 15 of the dual-voltage battery 1 and the first ground point 20 and the second ground point 21 are provided on the housing 24. The various electrical loads 16, 17, 18, 19, which are arranged distributed in the vehicle 23, are redundantly operated on electrical power by the dual-voltage battery 1.

Figure 3:
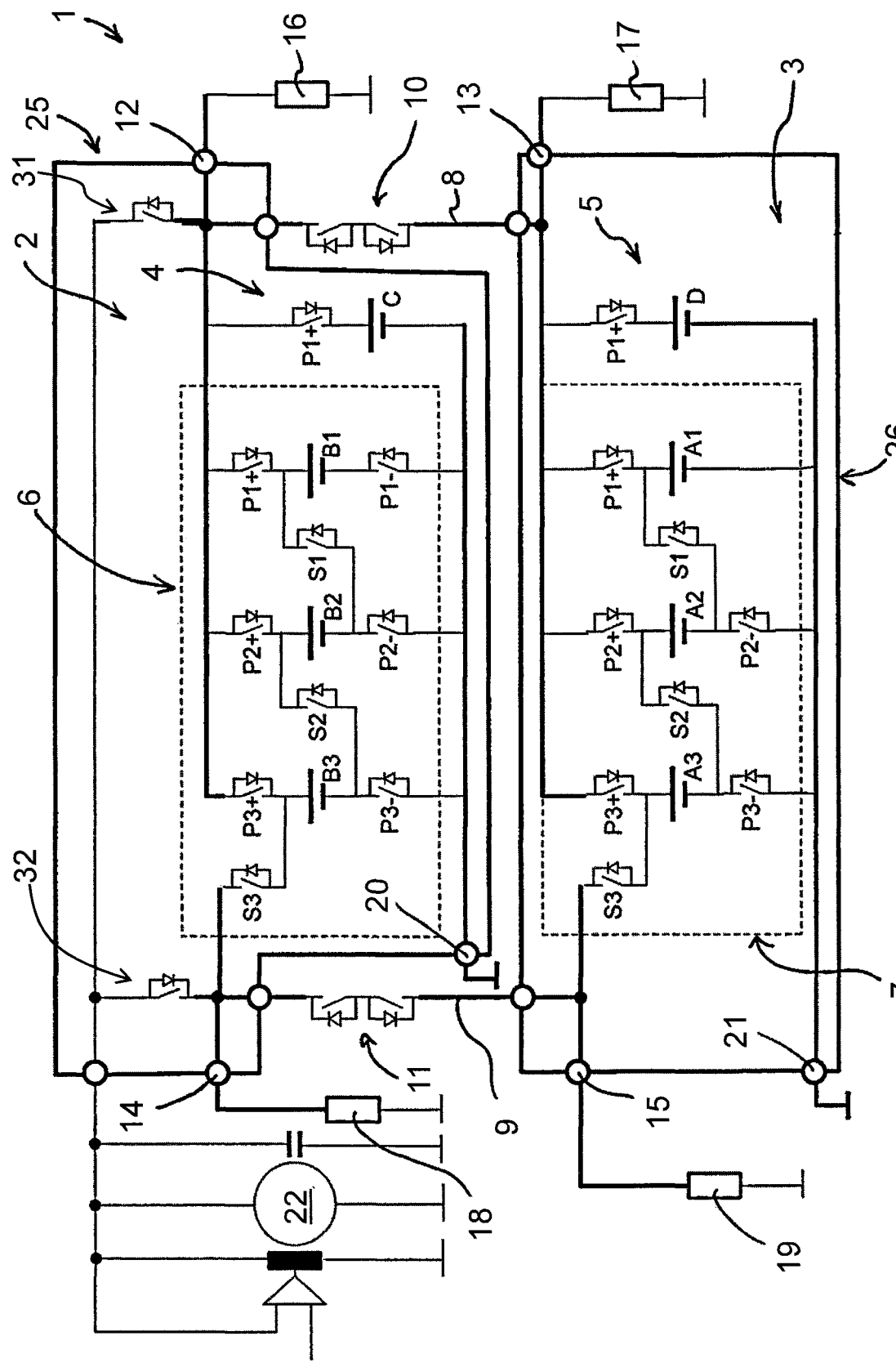
FIG. 3 is a second configuration of the dual-voltage battery according to the invention, wherein the energy submodules are arranged in separate housings.

While the dual-voltage battery 1 according to FIGS. 1 and 2 includes a common housing 24 for the first energy submodule 2 and the second energy submodule 3, in a second configuration according to FIG. 3, the dual-voltage battery 1 is modified such that a first housing 25 is provided for the first energy submodule 2 and a second housing 26 for the second energy submodule 3. The first line 8 and the second line 9 with the module disconnect switches 10, 11 are provided between the housings 25, 26. Thus, the first line 8 and the second line 9 and the module disconnectors 10, 11 are provided outside the housing 25, 26 of the dual-voltage battery 1. The further structure of the dual-voltage battery 1 is analogous, as shown.

By arranging the energy submodules 2, 3 in separate housings 25, 26, the redundant voltage supply for the vehicle 23 can be further improved. For example, the two energy submodules 2, 3 with the housings 25, 26 can be arranged distributed in the vehicle 23. The first energy submodule 2 with the first housing 25, for example, can be disposed in the region of the engine compartment, whereas the second energy submodule 3 with the second housing 26 can be arranged in the region of the rear axle of the vehicle 23. This results in improved protection from damage and from total failure of the dual-voltage battery 1, e.g., in the event of an accident. In this case, the vehicle is typically not simultaneously damaged in the front and the tail region of the vehicle, so that an electrical supply to the various electrical loads 16, 17, 18, 19 can always be maintained at the first voltage and the second voltage. Safety-critical functions, such as the operation of electric door locks, are then available even in the event of an accident.

Figure 4:
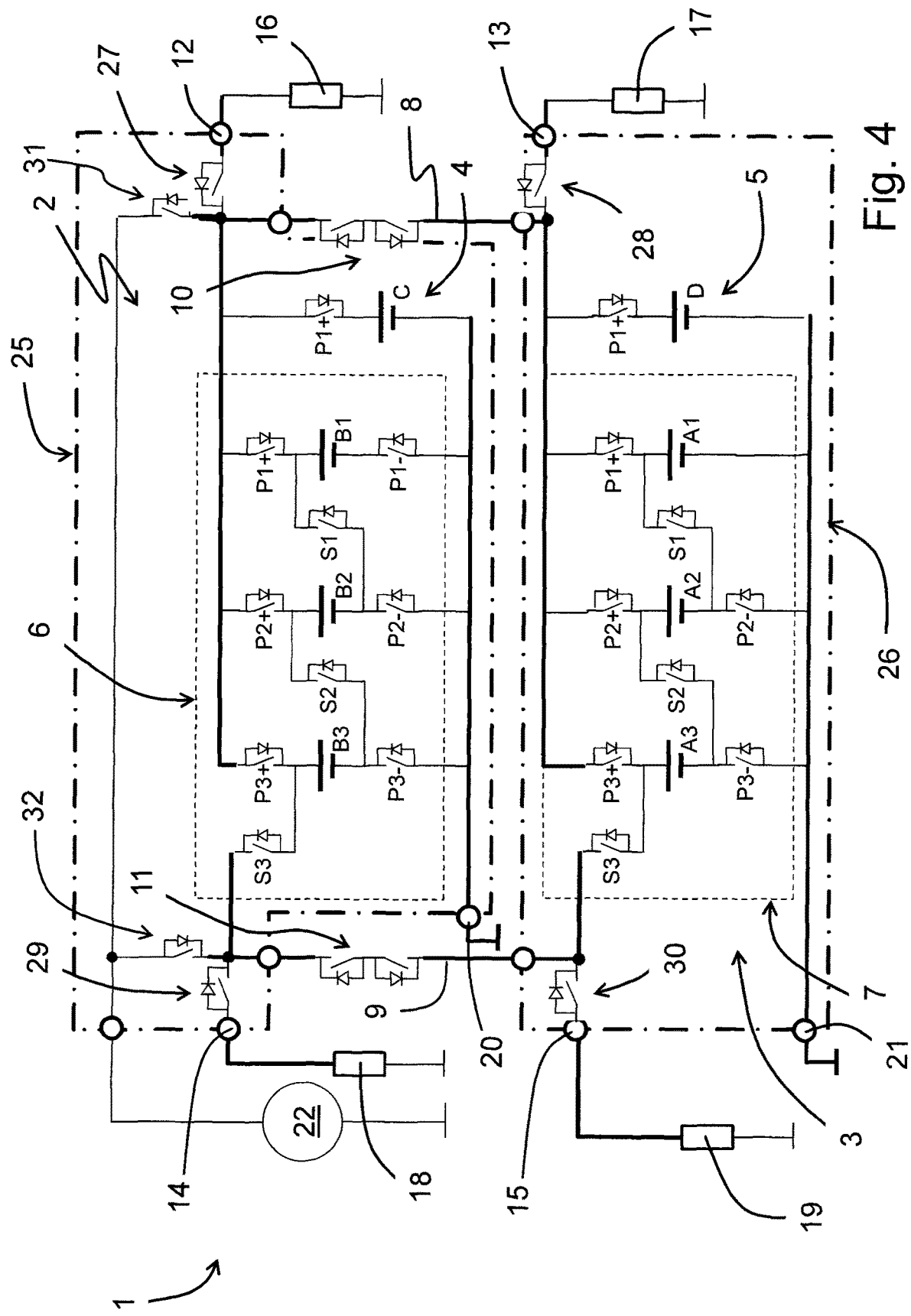
FIG. 4 is a third configuration of the dual-voltage battery according to the invention including fuse disconnectors.

According to a third configuration of the dual-voltage battery 1 shown in FIG. 4, for protection against faults, in particular a short circuit, fuse disconnectors 27, 28, 29, 30 are provided at one of the electrical loads 16, 17, 18, 19. The fuse disconnectors 27, 28, 29, 30 are arranged between the connection points 12, 13, 14, 15 of the dual-voltage battery 1 and the energy submodules 2, 3. In a closed position of the fuse disconnectors 27, 28, 29, 30, the electrical loads 16, 17, 18, 19 are connected to the energy submodules 2, 3 and are supplied with electrical power at the first voltage or at the second voltage. In an open position of the fuse disconnectors 27, 28, 29, 30, the electrical loads 16, 17, 18, 19 affected by a fault, or the partial vehicle electrical system connected to the connection point 12, 13, 14, 15, are disconnected from the voltage supply. Any fault in the affected partial vehicle electrical system is thus isolated, and the redundant voltage supply for all other parts of the vehicle electrical system is maintained. A retroactive effect of a fault in the partial vehicle electrical system on the dual-voltage battery 1 can also be prevented, with the result that the supply security for the vehicle is further improved.

The provision of the fuse disconnectors 27, 28, 29, 30 for all connection points 12, 13, 14, 15 is chosen only by way of example in the configuration described above. It may alternatively be provided to include a fuse disconnector 27, 28, 29, 30 only for a single connection point 12, 13, 14, 15 or a group of connection points 12, 13, 14, 15, i.e., the partial vehicle electrical systems connected to these connection points 12, 13, 14, 15, whereas other connection points are formed without fuse disconnectors. All partial vehicle electrical systems with their associated fuse disconnectors 27, 28, 29, 30 are thus able to isolate a fault.

Figure 5:
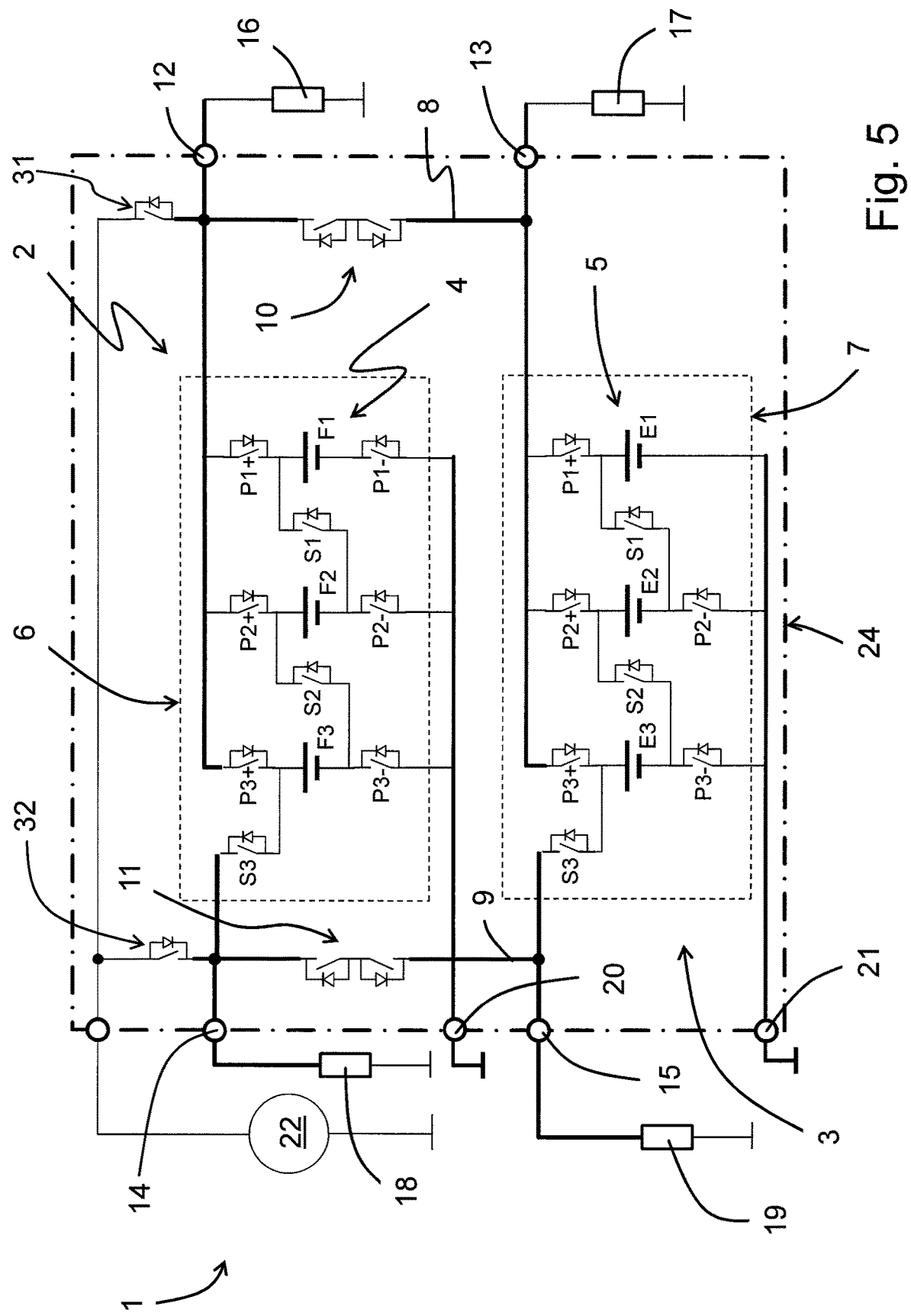
FIG. 5 is a fourth configuration of the dual-voltage battery according to the invention.
Figure 6:
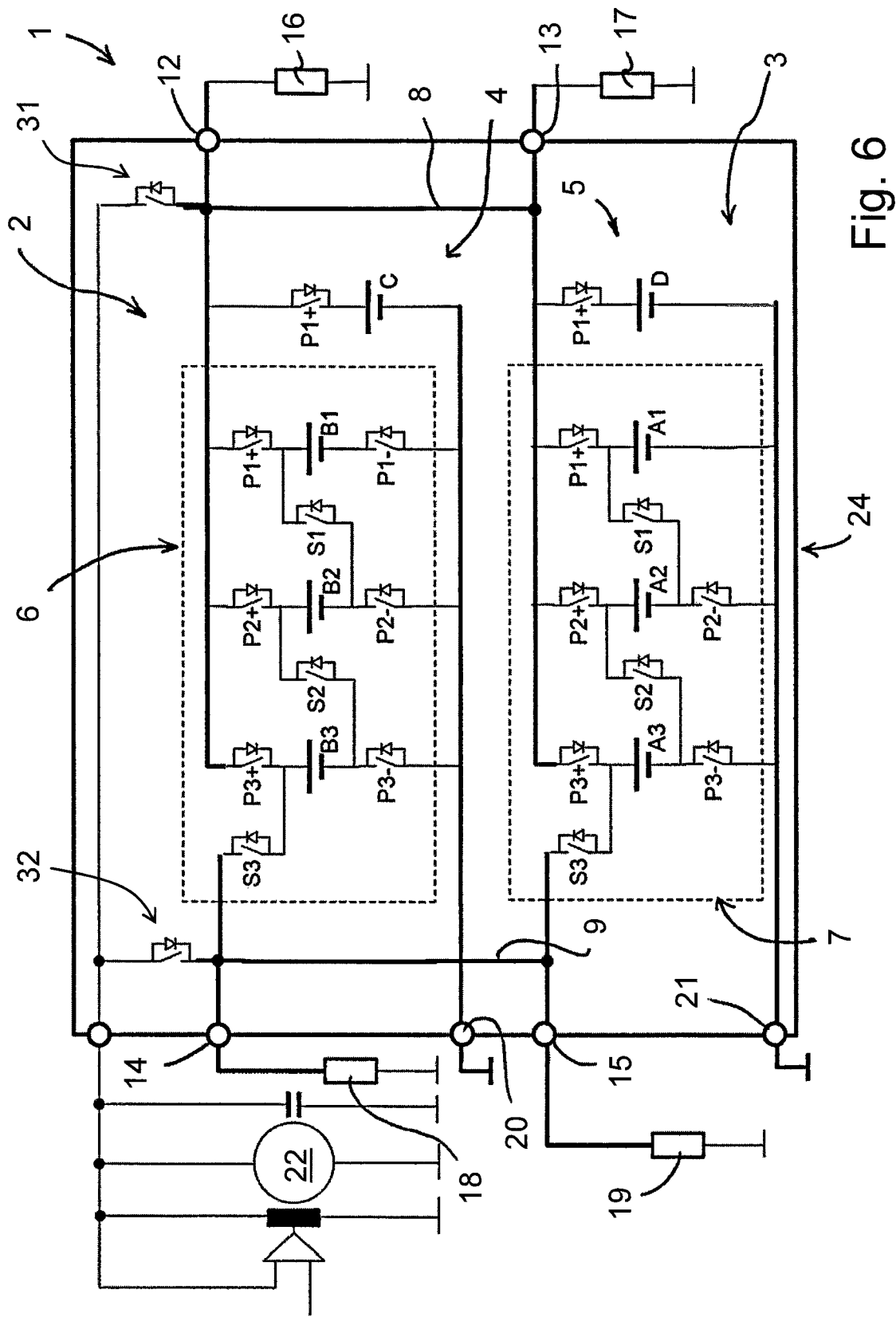
FIG. 6 is a fifth configuration of the dual-voltage battery according to the invention, in which the two sub-power modules are permanently connected.
Figure 7:
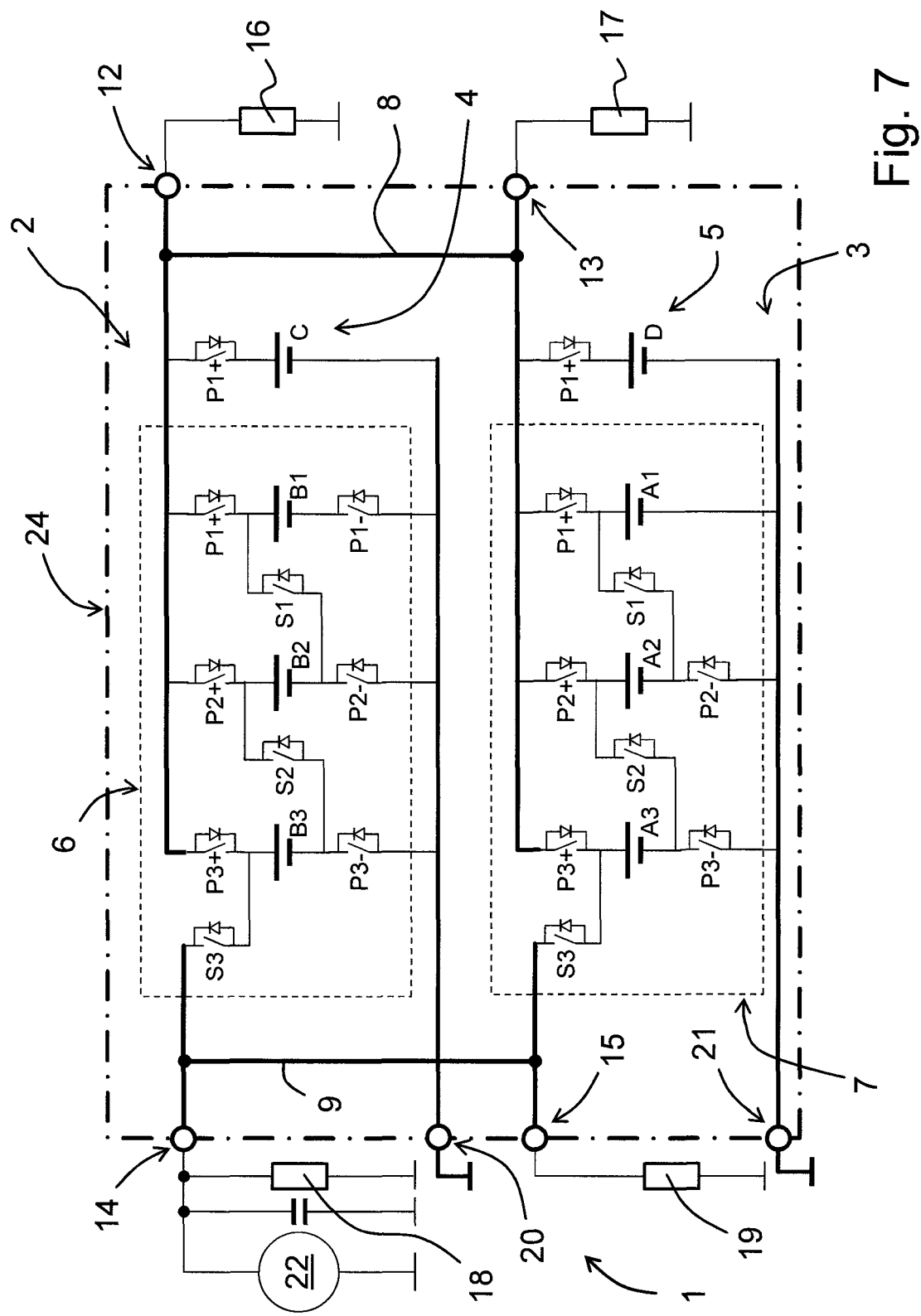
FIG. 7 is a sixth configuration of the dual-voltage battery according to the invention with a starter generator connected in modified form.
Figure 8:
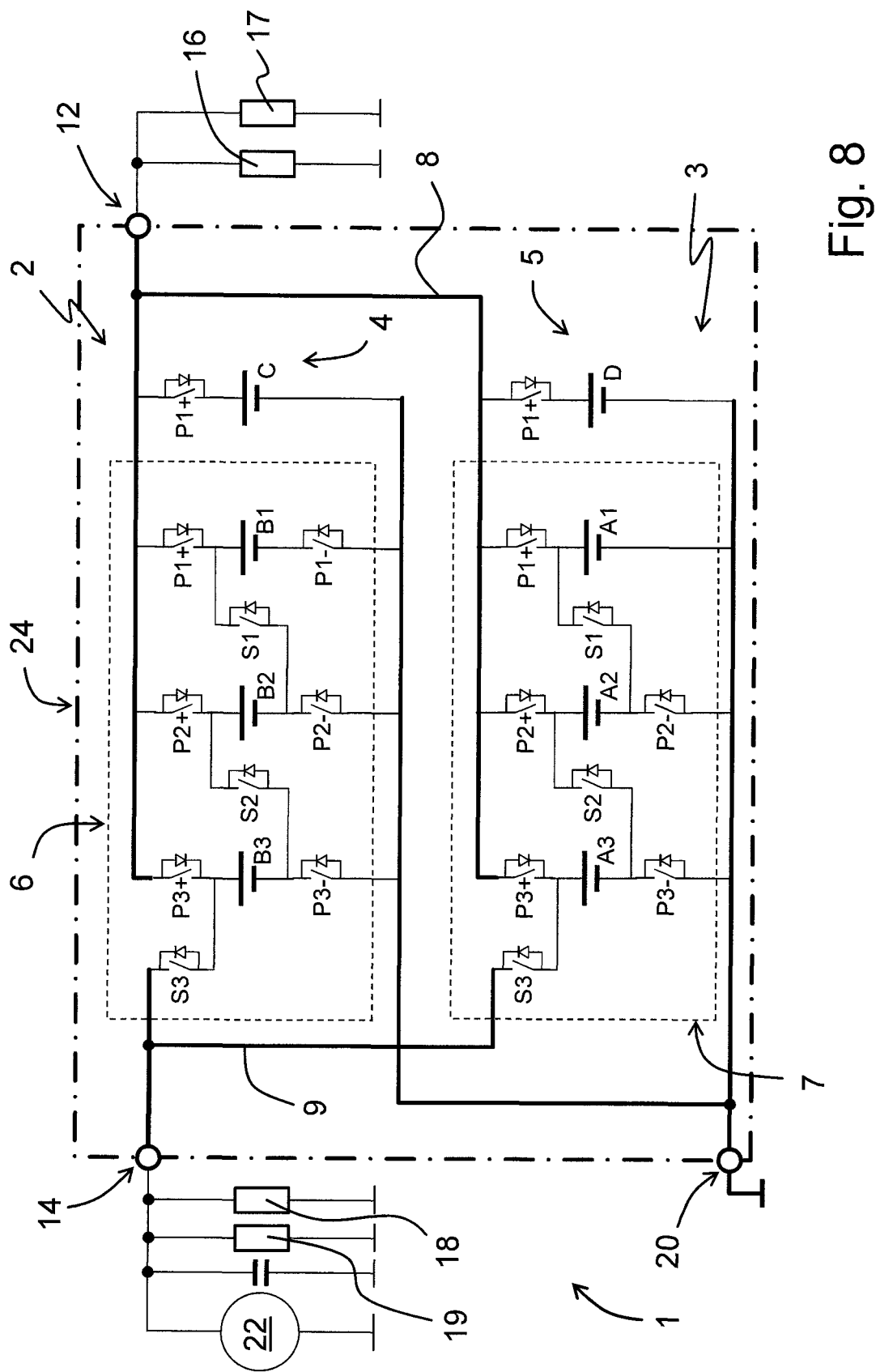
FIG. 8 is a seventh configuration of the dual-voltage battery according to the invention with common connection points for the two sub-modules.
Figure 9:
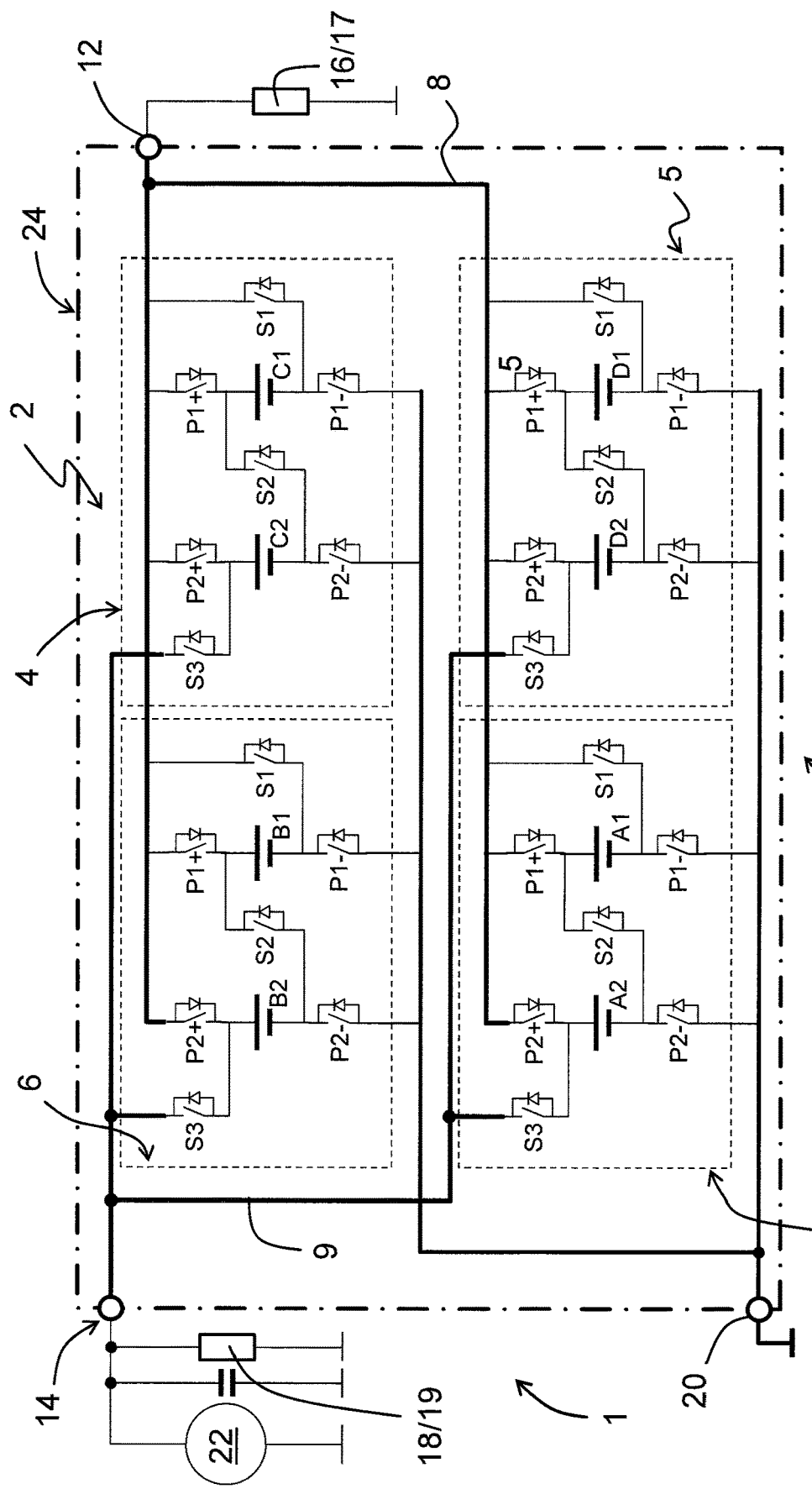
FIG. 9 is an eighth configuration of the dual-voltage battery according to the invention with four identical power supply units.
Figure 10:
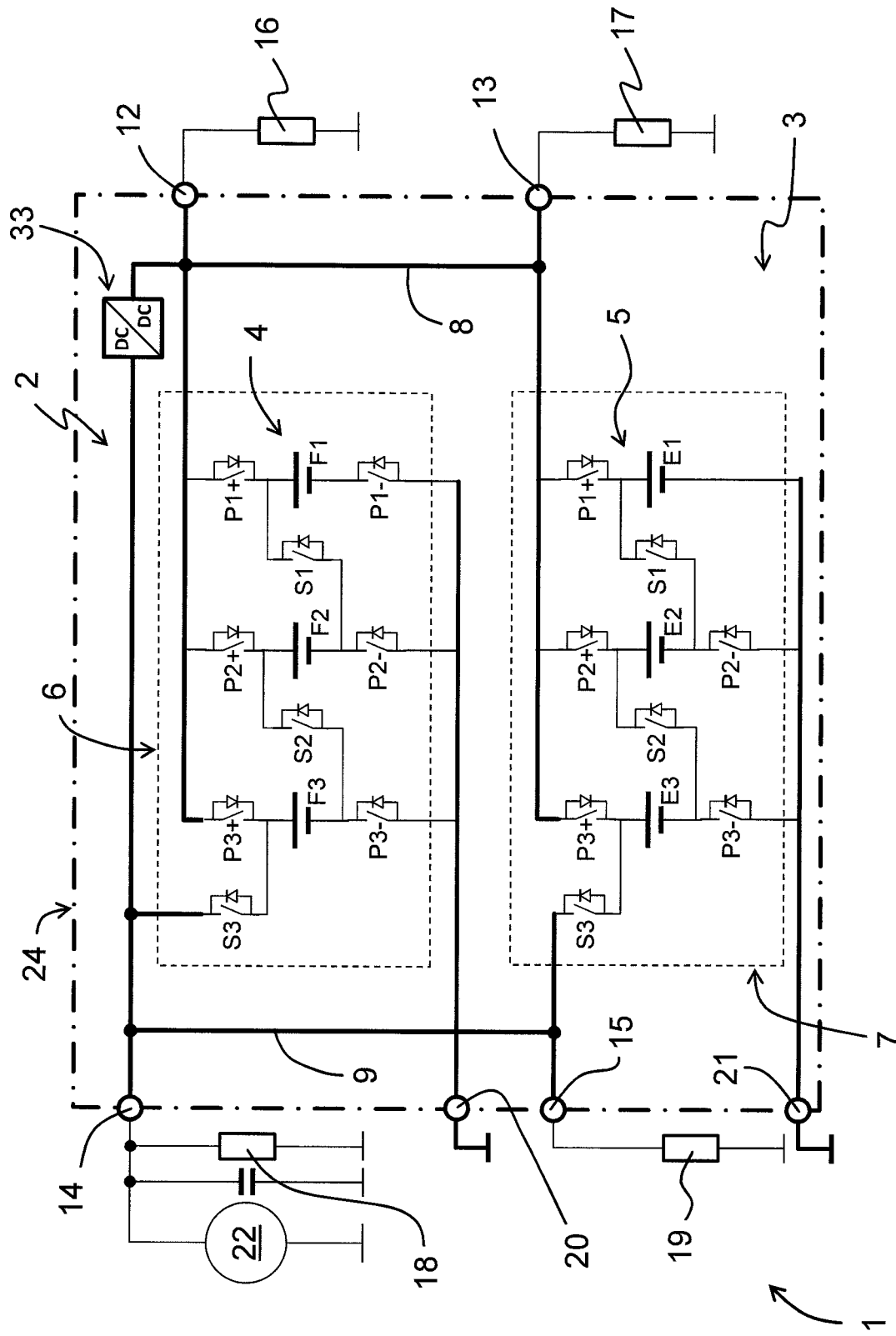
FIG. 10 is a ninth configuration of the dual-voltage battery according to the invention.

According to a fourth configuration shown in FIG. 5, the dual-voltage battery 1 has functionally integrated battery cell blocks E1, F1, which are associated at the same time with the first and the third voltage supply unit 4, 6 (battery cell block F1) or the second and fourth voltage supply unit 5, 7 (battery block E1). With a closed power switching element P1+, the first voltage is provided via the functionally integrated battery cell blocks E1, F1 at the first connection point 12 and at the second connection point 13. At the same time, the functionally integrated battery cell blocks E1, F1, together with the further battery cell blocks E2, E3, F2, F3 of the third voltage supply unit 6 and the fourth voltage supply unit 7, are used in the serial configuration of the battery cell blocks E1, E2, E3, F1, F2, F3 for providing the second voltage at the third connection point 14 or the fourth connection point 15. Otherwise, the fourth configuration of the dual-voltage battery 1 is configured analogous to the dual-voltage battery 1 in the first configuration. For example, a common housing 24 is provided, and fuse disconnectors 27, 28, 29, 30 are waived.

Advantageously, the dual-voltage battery in the fourth configuration can be produced inexpensively. In addition, it is characterized by small volume and low complexity because each energy submodule 2, 3, in the case shown has only three battery cell blocks E1, E2, E3, F1, F2, F3. In the event of a fault, redundancy in the voltage supply is nevertheless guaranteed, since even in the event of a fault of one of the two functionally integrated battery cell blocks E1, F1, all electrical loads 16, 17, 18, 19 can continue to be supplied with power.

The concept of functionally integrated battery cell blocks E1, F1 is not limited to the shown configuration of the dual-voltage battery 1. It is possible, for example, to provide the fuse disconnectors 27, 28, 29, 30 or to realize separate housings 25, 26 for the energy submodules 2, 3.

For example, instead of, or optionally in addition to, the starter-generator 22, a DC-DC converter can be provided, which is arranged between the two voltages of the dual-voltage battery and allows for an exchange of energy.

The same components and component features are designated by like reference numerals.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A dual-voltage battery for a vehicle, comprising:
   a plurality of battery cells, wherein in each case one group of battery cells is connected to form a battery cell block; and
   a battery electronics system with a plurality of power switching elements for connecting in series or parallel in any case individual battery cell blocks,
   wherein in a first connection arrangement of the battery cell blocks, a first voltage is provided,
   wherein in a second connection arrangement of the battery cell blocks, a second voltage is provided,
   wherein at least one first battery cell block is provided as part of a first voltage supply unit, at least one second battery cell block is provided as part of a second voltage supply unit, at least two third battery cell blocks are provided as part of a third voltage supply unit and at least two fourth battery cell blocks are provided as part of a fourth voltage supply unit,
   wherein the first voltage supply unit and the third voltage supply unit form a first energy submodule and the second voltage supply unit and the fourth voltage supply unit form a second energy submodule,
   wherein the voltage supply units are interconnected such that the first voltage is provided:
      separately by the first energy submodule or by the second energy submodule at a first connection point or at a second connection point of the dual-voltage battery; or
      together by the first energy submodule and by the second energy submodule at the first connection point or at the second connection point of the dual-voltage battery,
   wherein the second voltage is provided:
      separately by the first energy submodule and by the second energy submodule at a third connection point or at a fourth connection point of the dual-voltage battery; or
      together by the first energy submodule and by the second energy submodule at the third connection point or at the fourth connection point of the dual-voltage battery, and
   wherein the first energy submodule is configured to selectively provide the first voltage and the second voltage and the second energy submodule is configured to selectively provide the first voltage and the second voltage.

2. A dual-voltage battery according to claim 1, wherein between the first energy submodule and the second energy submodule, a first module disconnect switch for a first line having the first voltage or a second module disconnect switch for a second line having the second voltage is provided,
   wherein in a normal operating state, the module disconnect switches are closed for connecting the energy submodules, and
   wherein in an emergency operating state of the dual-voltage battery, at least one module disconnect switch is open, the emergency operating stating existing when a fault occurs or when a voltage supply unit of the dual-voltage battery fails.

3. A dual-voltage battery according to claim 1, wherein in the first connection arrangement or in the second connection arrangement of the first voltage supply unit and of the second voltage supply unit, the first voltage is provided.

4. A dual-voltage battery according to claim 1, wherein the third voltage supply unit and the fourth voltage supply unit provide the first voltage in the first connection arrangement or provide the second voltage in the second connection arrangement.

5. A dual-voltage battery according to claim 1, wherein the first voltage supply unit or the second voltage supply unit comprise exactly one battery cell block.

6. A dual-voltage battery according to claim 1, wherein the third voltage supply unit or the fourth voltage supply unit comprise three battery cell blocks,
   wherein the three battery cell blocks are internally connected in parallel or series.

7. A dual-voltage battery according to claim 1, wherein all of the battery cell blocks are identical.

8. A dual-voltage battery according to claim 1, wherein separate housings are provided for the first energy submodule and for the second energy submodule.

9. A dual-voltage battery according to claim 1, wherein the first energy submodule and the second energy submodule are provided in a common housing.

10. A dual-voltage battery according to claim 1, wherein a common ground point is provided for the first energy submodule and for the second energy submodule.

11. A dual-voltage battery according to claim 1, wherein separate ground points are provided for the first energy submodule and for the second energy submodule.

12. A dual-voltage battery according to claim 1, wherein the module disconnect switches are arranged outside the at least one housing of the energy submodules.

13. A dual-voltage battery according to claim 1, wherein the module disconnect switches are arranged within the at least one housing of the energy submodules.

14. A dual-voltage battery according to claim 1, wherein between individual connection points and the energy submodules, fuse disconnectors are provided,
wherein in a closed position of the fuse disconnectors, the electrical load associated with the respective connection point is connected, and
wherein in an open position of the fuse disconnector, the electrical load associated with the respective connection point is disconnected.

15. A dual-voltage battery according to claim 1, wherein for the first voltage supply unit and the second voltage supply unit and the third voltage supply unit and the fourth voltage supply unit, a common connection point is provided and/or that for the third voltage supply unit and for the fourth voltage supply unit, a common connection point is provided.

16. A dual-voltage battery according to claim 1, wherein for the first energy submodule and for the second energy submodule, a common ground point is provided.

17. A dual-voltage battery according to claim 1, wherein between the first voltage supply unit and/or the second voltage supply unit on the one hand, and the third voltage supply unit and/or the fourth voltage supply unit on the other hand, a DC-DC converter is provided for converting the first voltage into the second voltage and/or for converting the second voltage into the first voltage.

18. A dual-voltage battery according to claim 1, wherein the first voltage supply unit and/or the second voltage supply unit and/or the third voltage supply unit and/or the fourth voltage supply unit has two battery cell blocks, wherein the battery cell blocks of the first and/or the second and/or the third and/or the fourth voltage supply unit can optionally be brought either into a serial and into a parallel switching position by means of the power switching elements.

19. A dual-voltage battery, comprising:
a first energy submodule comprising:
a first battery cell block forming a first voltage supply unit;
a second battery cell block including a plurality of battery cells forming a second voltage supply unit; and
a first ground point; and
a second energy module comprising:
a third battery cell block forming a third voltage supply unit;
a fourth battery cell block including a plurality of battery cells forming a fourth voltage supply unit; and
a second ground point, separate from the first ground point,
wherein the first energy submodule is configured to selectively provide the first voltage and the second voltage and the second energy submodule is configured to selectively provide the first voltage and the second voltage to an electrical load.

20. The dual-voltage battery according to claim 19, wherein the first ground point and the second ground point are separated by a housing.

21. A system, comprising:
a plurality of electrical loads; and
dual-voltage battery, comprising:
a first energy submodule comprising:
a first battery cell block forming a first voltage supply unit;
a second battery cell block including a plurality of battery cells forming a second voltage supply unit; and
a first ground point; and
a second energy module comprising:
a third battery cell block forming a third voltage supply unit;
a fourth battery cell block including a plurality of battery cells forming a fourth voltage supply unit; and
a second ground point, separate from the first ground point,
wherein the first energy submodule is configured to selectively provide the first voltage and the second voltage and the second energy submodule is configured to selectively provide the first voltage and the second voltage to each of the electrical loads.

* * * * *